US011897351B2

(12) United States Patent
Li (10) Patent No.: US 11,897,351 B2
(45) Date of Patent: Feb. 13, 2024

(54) ELECTRICAL CONNECTOR (71) Applicant: T-CONN PRECISION CORPORATION, New Taipei (TW)

(72) Inventor: Ju-Ping Li, New Taipei (TW)

(73) Assignee: T-CONN PRECISION CORPORATION, New Taipel (TW)

(*) Notice: Subject to any disclaimer, the term of this patent is extended or adjusted under 35 U.S.C. 154(b) by 217 days.

(21) Appl. No.: 17/514,150

(22) Filed: Oct. 29, 2021

(65) Prior Publication Data
US 2023/0071830 A1 Mar. 9, 2023

(30) Foreign Application Priority Data

Sep. 3, 2021 (TW) ................. 110132887

(51) Int. Cl.
B60L 53/16 (2019.01)
B60L 53/30 (2019.01)
H01R 13/10 (2006.01)
H01R 13/50 (2006.01)

(52) U.S. Cl.
CPC ............. B60L 53/16 (2019.02); B60L 53/305 (2019.02); H01R 13/10 (2013.01); H01R 13/50 (2013.01); H01R 2201/26 (2013.01)

(58) Field of Classification Search
CPC ....... B60L 53/16; B60L 53/305; H01R 13/10; H01R 13/50; H01R 2201/26
USPC ........................................................ 320/109
See application file for complete search history.

(56) References Cited

U.S. PATENT DOCUMENTS

| 2008/0220652 A1* | 9/2008 | Tyler ...................... H01R 13/53 439/607.41 |
| 2020/0227868 A1* | 7/2020 | Kitamoto ........... H01R 13/6205 |
| 2023/0117380 A1* | 4/2023 | Huang ................... H01R 27/02 439/283 |

FOREIGN PATENT DOCUMENTS

| CN | 108832345 A | * | 11/2018 | ............. H01R 13/04 |
| CN | 113844294 A | * | 12/2021 | |
| CN | 215955535 U | * | 3/2022 | |
| DE | 102016220900 A1 | * | 4/2018 | ............. B60L 53/16 |
| DE | 102017122490 A1 | * | 3/2019 | ............. B60L 53/16 |
| EP | 2942843 A1 | | 11/2015 | |
| EP | 3139452 A1 | | 3/2017 | |
| EP | 3139452 A1 | * | 3/2017 | ............. B60L 53/16 |
| EP | 3331099 A1 | | 6/2018 | |
| EP | 3331099 A1 | * | 6/2018 | ............. B60L 53/16 |
| EP | 3819997 A1 | * | 5/2021 | ............. B60L 53/16 |

(Continued)

Primary Examiner — Suresh Memula
(74) Attorney, Agent, or Firm — RABIN & BERDO, P.C.

(57) ABSTRACT

An electrical connector has a base, a first power terminal, a second power terminal, and multiple signal terminals. The base has a connecting portion having a flat face divided into a first region and a second region. The first and the second power terminals are disposed within the first region of the connecting portion. The multiple signal terminals are disposed within the second region of the connecting portion. At least one signal terminal is apart from the first power terminal by a first distance, and at least one of the other signal terminals is apart from the second power terminal by a second distance. The second distance is larger than the first distance. Arrangement of the first power terminal, the second power terminal, and the multiple signal terminals prevents the first power terminal, the second power terminal, and the multiple signal terminals from interfering with one another.

19 Claims, 5 Drawing Sheets (56) References Cited

FOREIGN PATENT DOCUMENTS

| | | | | |
|---|---|---|---|---|
| EP | 3819997 | A1 | 5/2021 | |
| EP | 4144572 | A1 * | 3/2023 | ............. B60L 53/16 |
| KR | 101473486 | B1 * | 12/2014 | |
| WO | WO-2014147760 | A1 * | 9/2014 | ............. B60L 53/16 |
| WO | WO-2014147761 | A1 * | 9/2014 | ............. B60L 53/16 |
| WO | WO-2023008027 | A1 * | 2/2023 | |
| WO | WO-2023008029 | A1 * | 2/2023 | |
| WO | WO-2023008040 | A1 * | 2/2023 | |
| WO | WO-2023008041 | A1 * | 2/2023 | |

\* cited by examiner

ELECTRICAL CONNECTOR

BACKGROUND OF THE INVENTION

1. Field of the Invention

The present invention relates to an electrical connector, and more particularly to an electrical connector for electrical charging and capable of transmitting electricity and signals.

2. Description of Related Art

Electric vehicles have become the hottest industry in recent years due to energy and environmental protection issues, which jointly promotes research and development of technologies related to the electric vehicles. The important key to the normal operation of the electric vehicles is obviously electricity, and the electricity comes from on-board batteries of the electric vehicles and related devices and facilities for charging the on-board batteries.

With respect to charging of the electric vehicles, the on-board batteries of an electric vehicle are connected to a charging apparatus (such as a charging pile) via an intermediary device. A common intermediary device is an electrical connector. The charging apparatus is connected to the on-board batteries of the electric vehicle via the electrical connector. A traditional charging process is simply supplying power. However, with considerations of increasing power supply for charging, efficiency, and safety, a charging process is not just about power supply, but also involves detection and monitoring of various states and parameters. Therefore, corresponding signals that need to be detected and monitored are generated before, during, or after charging.

It is a reasonable and inevitable design to integrate power supply and signal transmission interface on said electrical connector. However, although electrical power and monitored signals are transmitted on the same medium, after all, the electrical power and the monitored signals are completely different energy types, and interference may even occur during simultaneous transmission of the electrical power and the monitored signals. Therefore, it is imperative to integrate power and signal transmission on the electrical connector under the consideration of how the power and signal transmission can operate at the same time without interfering with each other, so as to meet actual needs.

To overcome the shortcomings, the present invention provides an electrical connector to mitigate or obviate the aforementioned problems.

SUMMARY OF THE INVENTION

The main objective of the present invention is to provide an electrical connector that is capable of transmitting electricity and signals without interfering with each other.

The electrical connector has a base, a first power terminal, a second power terminal, and multiple signal terminals. The base has a connecting portion having a flat face divided into a first region and a second region. The first and the second power terminals are disposed within the first region of the connecting portion. The multiple signal terminals are disposed within the second region of the connecting portion. At least one of the multiple signal terminals is apart from the first power terminal by a first distance, and at least one of the other signal terminals is apart from the second power terminal by a second distance. The second distance is larger than the first distance. Arrangement of the first power terminal, the second power terminal, and the multiple signal terminals prevents the first power terminal, the second power terminal, and the multiple signal terminals from interfering with one another.

Other objects, advantages, and novel features of the invention will become more apparent from the following detailed description when taken in conjunction with the accompanying drawings.

DETAILED DESCRIPTION OF PREFERRED EMBODIMENTS

Figure 1:
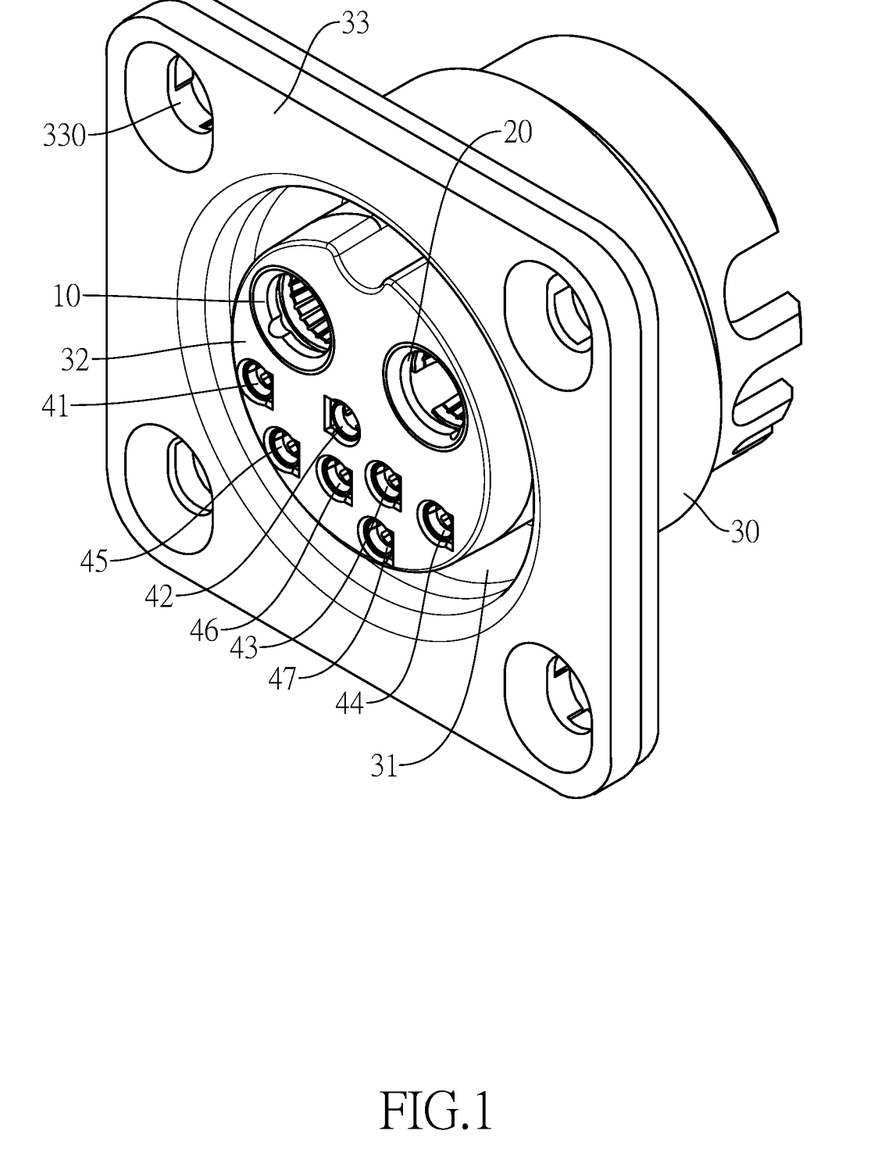
FIG. 1 is a perspective view of an electrical connector in accordance with the present invention.

With reference to FIG. 1, an electrical connector in accordance with the present invention has a base 30, a first power terminal 10, a second power terminal 20, and multiple signal terminals 41-47. The base 30 has a recession 31 and a connecting portion 32 disposed within the recession 31. The recession 31 and the connecting portion 32 correspond in shape. In the present invention, the recession 31 is circular in cross-section and the connecting portion 32 is a round pillar. The connecting portion 32 extends upward from a bottom of the recession 31 coaxially. A gap is formed between an inner side surface defined around the recession 31 and a peripheral surface of the connecting portion 32 and turns into an annular space.

Figure 2:
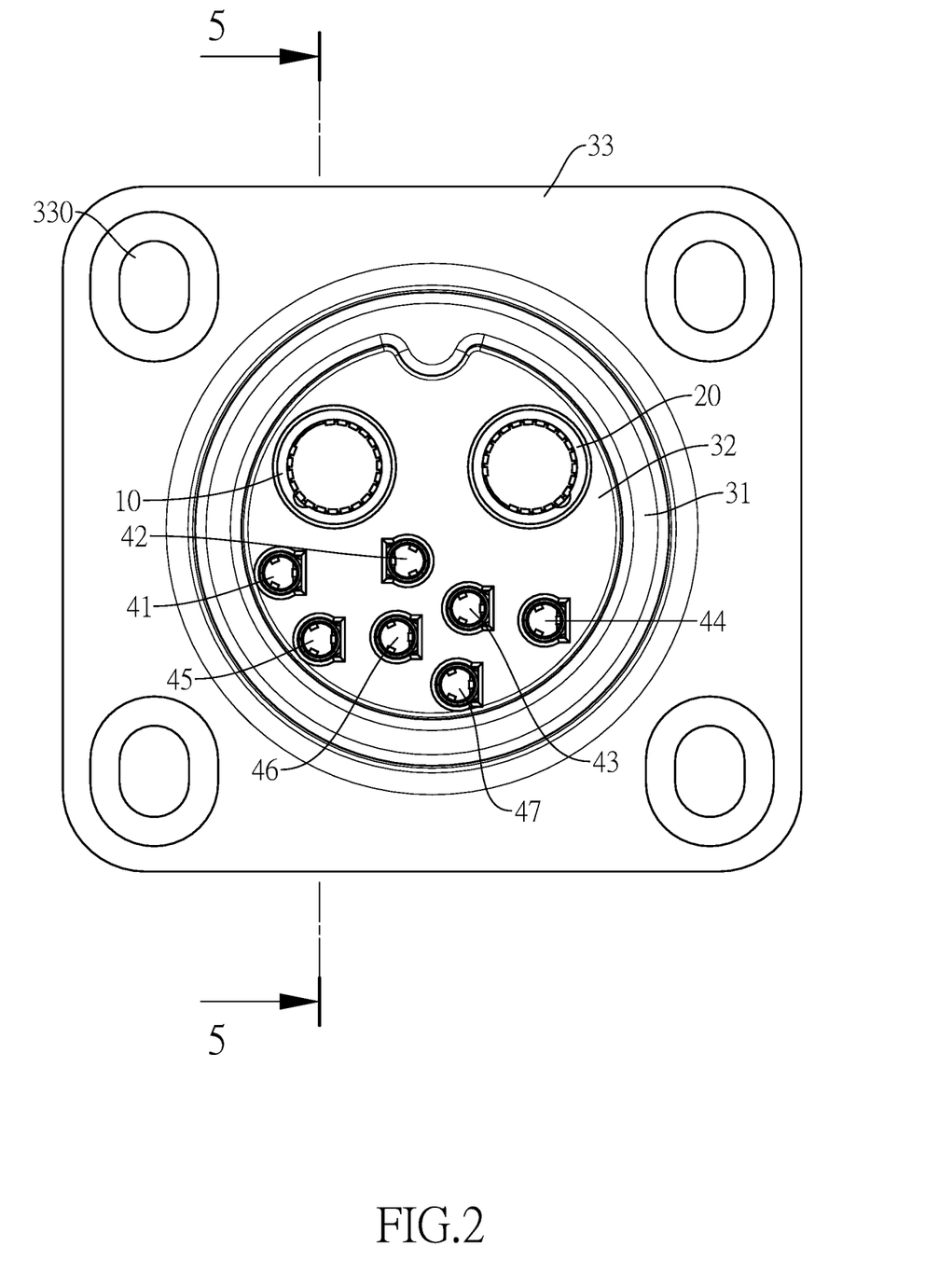
FIG. 2 is a front view of the electrical connector in FIG. 1.
Figure 3:
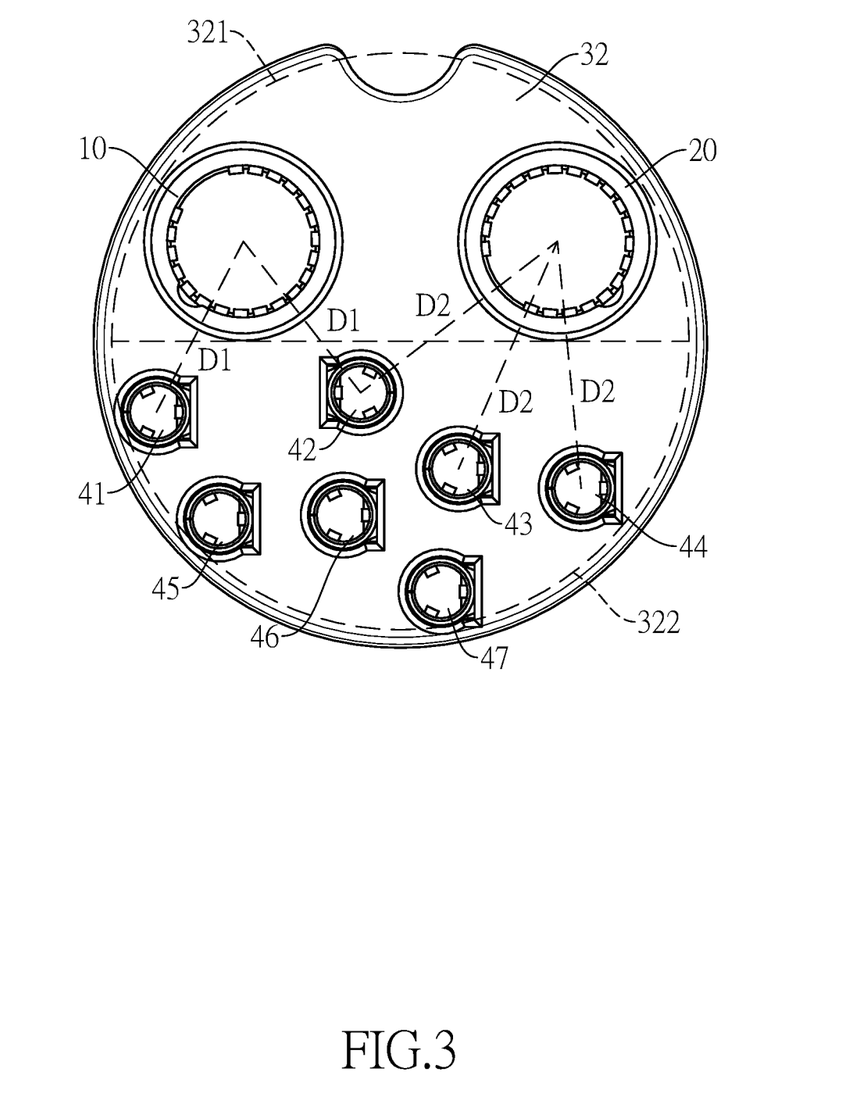
FIG. 3 is an enlarged front view of the electrical connector in FIG. 1, showing arrangement of terminals of the electrical connector.

With reference to FIGS. 2 and 3, the connecting portion 32 has a flat face divided into a first region 321 and a second region 322. The first power terminal 10 and the second terminal 20 are arranged in the first region 321. The multiple signal terminals 41 to 47 are arranged in the second region 322. In the present invention, the connecting portion 32 is a round pillar, and the flat face of the connecting portion 32 is circular and is equally divided into the first region 321 and the second region 322 by 180 degrees. In FIG. 3, a semi-circle above a dividing line extending toward 90 degrees and 270 degrees is defined as the first region 321, and the other semi-circle below the dividing line at 90 degrees and 270 degrees is defined as the second region 322. The connecting portion 32 is a round pillar, and the first region 321 and the second region 322 being symmetrical semi-circles are merely for illustration. The shapes of the connecting portion 32, the first region 321, and the second region 322 are not restricted.

In the present invention, the first power terminal 10 is a negative terminal and the second power terminal 20 is a positive terminal for compliance with safety requirements of common electrical connectors such as requirement of withstand voltage or requirement of insulation resistance. A substantially large distance remaining between the first power terminal 10 and the second power terminal 20 is in the first region 321. Specifically, the distance between the first power terminal 10 and the second power terminal 20 is larger than a distance between each two of the signal terminals 41-47 that are disposed adjacent to each other. The distance between the first power terminal 10 and the second power terminal 20 is also larger than a distance between the first power terminal 10 and each one of the signal terminals 41-47. The distance between the first power terminal 10 and the second power terminal 20 is larger than a distance between the second power terminal 20 and each one the signal terminals 41-47 as well.

In the present invention, the signal terminals 41-47 are disposed within the second region 322 of the connecting portion 32. Functions of pins of the signal terminals 41-47 are defined in the table listed below, which are charging detection (Charge DET), not available (N/A), confirmation of batteries communication (Cable DET), batteries awaking (Wake up), low-voltage bus signal (CAN L), high-voltage bus signal (CAN H), and terminal test (Terminal DET).

| Numbering of signal terminal | Function of pin of signal terminal |
| --- | --- |
| 41 | Charge DET |
| 42 | N/A |
| 43 | Cable DET |
| 44 | Wake up |
| 45 | CAN L |
| 46 | CAN H |
| 47 | Terminal DET |

Moreover, in the signal terminals 41-47, the signal terminals 41-44 for charging detection (Charge DET), not available (N/A), confirmation of batteries communication (Cable DET), and batteries awaking (Wake up) are arranged at a border of the first region 321. Wherein the signal terminal 41 for charging detection (Charge DET) and the signal terminal 42 not available (N/A) are adjacent to the first power terminal 10. The signal terminal 41 for charging detection (Charge DET) and the first power terminal 10 have a first distance D1 therebetween. The signal terminal 42 not available (N/A) and the first power terminal 10 have the same first distance D1 therebetween. Furthermore, the signal terminal 42 not available (N/A), the signal terminal 43 for confirmation of batteries communication (Cable DET), and the signal terminal 44 for batteries awaking (Wake up) are adjacent to the second power terminal 20. The signal terminal 42 not available (N/A) and the second power terminal 20 have a second distance D2. The signal terminal 43 for confirmation of batteries communication (Cable DET) and the second power terminal 20 have the same second distance D2. The signal terminal 44 for batteries awaking (Wake up) and the second power terminal 20 have the same distance D2. Each second distance D2 is larger than each first distance D1.

Since the first power terminal 10 is a negative terminal, signal transmission of the signal terminal 42 not available (N/A) or the signal terminal 43 for confirmation of batteries communication (Cable DET) is free from interference by the first power terminal 10. Therefore, the first distance D1 may be designed as a short distance. Signal transmission of the signal terminal 42 not available (N/A), the signal terminal 43 for confirmation of batteries communication (Cable DET), or the signal terminal 44 for batteries awaking (Wake up) may be interfered by the second power terminal 20, which is a positive terminal when the second power terminal 20 is charging. Therefore, the signal terminal 42 not available (N/A), the signal terminal 43 for confirmation of batteries communication (Cable DET), and the signal terminal 44 for batteries awaking (Wake up) respectively have to maintain a certain distance such as the second distance D2 that is larger than the first distance D1.

In order to prevent signal transmission of the signal terminals 41-47 from being interfered by the second power terminal 20 during charging, the signal terminal 45 for low-voltage bus signal (CAN L), the signal terminal 46 for high-voltage bus signal (CAN H), and the signal terminal 47 for terminal test (Terminal DET) always in a status of signal transmission are disposed within the second region 322 and away from the first region 321 to keep a relative far distance from the second power terminal 20 to make sure the signal terminals 45-47 are free from interfering by the second power terminal 20.

Figure 4:
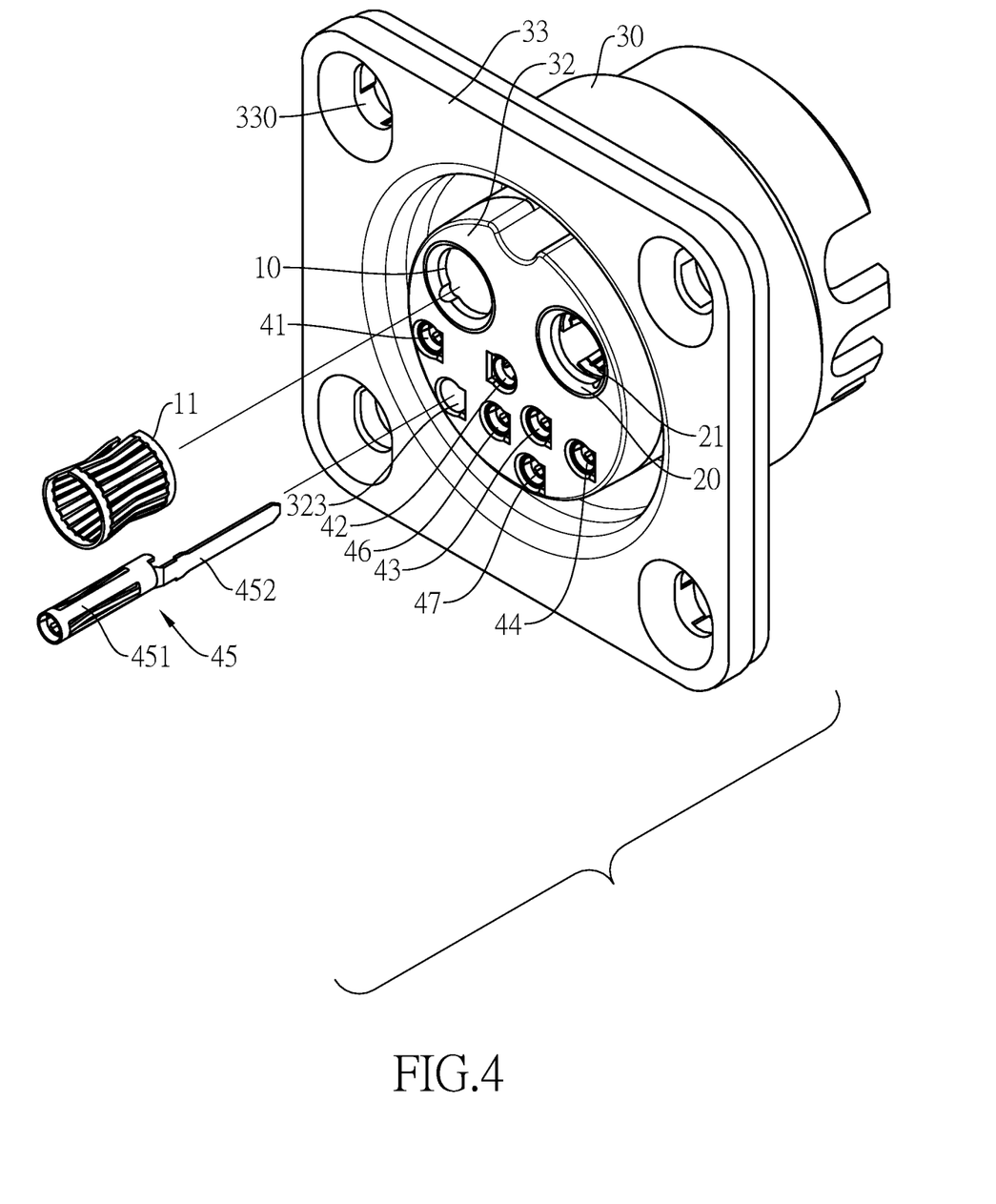
FIG. 4 is a partially exploded perspective view of the electrical connector in FIG. 1.

With regard to assembly of the first power terminal 10, the second power terminal 20, and the signal terminals 41-47 to the connecting portion 32 of the base 30, please further refer to FIG. 4. The first power terminal 10 and the second power terminal 20 are axially embedded in the connecting portion 32 of the base 30. Specifically, the first power terminal 10 and the second power terminal 20 are inserted into a core in advance for production when the base 30 is molded. The first power terminal 10 and the second power terminal 20 are simultaneously assembled to the connecting portion 32 of the base 30 after the base 30 is molded.

Figure 5:
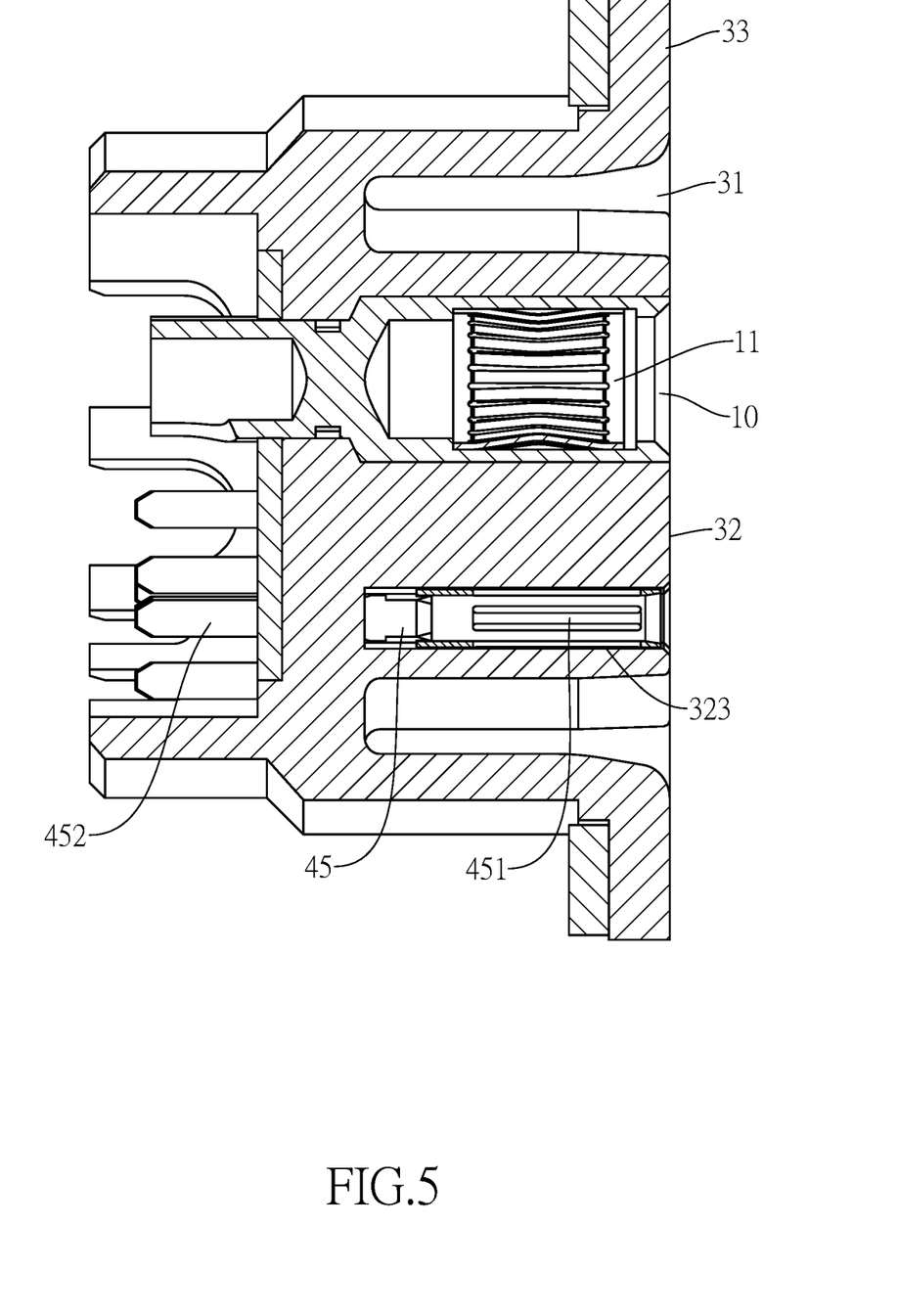
FIG. 5 is a cross-sectional side view of the electrical connector along line 5-5 in FIG. 1.

With reference to FIG. 5, the first power terminal 10 and the second power terminal 20 each have a respective end being adjacent to the flat face of the connecting portion 32 and being hollow to form an inserting hole. The first power terminal 10 and the second power terminal 20 each have another respective end exposed at a bottom of the base 30 of the electrical connector of the present invention. In order to provide stable electrical connection, there are two elastic connectors 11, 21 respectively disposed within said inserting holes of the first power terminal 10 and the second power terminal 20. Each elastic connector 11/21 has multiple connecting points for electrical connection. The two elastic connectors 11, 21 are respectively disposed within the two inserting holes of the first power terminal 10 and the second power terminal 20. The two elastic connectors 11, 21 respectively disposed within the said inserting holes ensure that probes respectively inserted in the inserting holes are in stable electrical connection. In the present invention, the two elastic connectors 11, 21 are two crown spring connectors.

In addition, the signal terminals 41-47 are assembled to the connecting portion 32 of the base 30. The connecting portion 32 has terminal recessions 323 respectively for assembling the signal terminals 41-47. One of two ends of each terminal recession 323 is defined through the flat face of the connecting portion 32, and the other one of the two ends of each terminal recession 323 is defined through the bottom of the base 30 to form a pin hole. For example, the signal terminal 45 has a contact 451 being tubular and a narrow pin 452 respectively disposed at two ends of the signal terminal 45. The contact 451 is disposed within one of the terminal recessions 323, and the narrow pin 452 extends out from the terminal recession 323 for exterior connection.

With reference to FIGS. 2 and 4, the base 30 has a top end and a fixing portion 33 disposed at the top end of the base 30 and outward expands along radial directions of the recession 31. The fixing portion 33 is provided with connection of the electrical connector of the present invention. In the present invention, the fixing portion 33 is rectangular and has a fixing hole 330 formed at each corner of the fixing portion 33 to accommodate other fixing units for fixation.

As stated above, the present invention provides the electrical connector for transmitting electrical power and signals. Power terminals and signal terminals of the electrical connector of the present invention are arranged at different regions by space planning. Terminals for same or similar energy type are arranged at a same region. In addition, with respect to efficient space utilization, distances between the signal terminal and the power terminal are further designed according to signal properties. Therefore, the electrical connector of the present invention can ensure that the power terminals and the signal terminals are free from interfering during power and signal transmission. The electrical connector of the present invention complies with safety requirements of common electrical connectors such as requirement of withstand voltage or requirement of insulation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electrical connector comprising:
   a base having
      a connecting portion having a flat face divided into a first region and a second region;
   two power terminals including a first power terminal and a second power terminal, and the first power terminal and the second power terminal disposed at the connecting portion and within the first region; and
   multiple signal terminals disposed at the connecting portion and within the second region, wherein
      at least one of the multiple signal terminals is apart from the first power terminal by a first distance;
      at least one of the other multiple signal terminals is apart from the second power terminal by a second distance; and
      the second distance is larger than the first distance; and
   wherein
      a distance defined between the first power terminal and the second power terminal is larger than a distance defined between each two of the multiple signal terminals that are disposed adjacent to each other;
      the distance defined between the first power terminal and the second power terminal is larger than a distance defined between each one of the multiple signal terminals and the first power terminal; and
      the distance defined between the first power terminal and the second power terminal is larger than a distance defined between each one of the multiple signal terminals and the second power terminal.

2. The electrical connector as claimed in claim 1, wherein
   three of the multiple signal terminals are respectively for charging detection (Charge DET), confirmation of batteries communication (Cable DET), and batteries awaking (Wake up) and are arranged within the second region and are disposed adjacent to a border between the first region and the second region;
   the signal terminal for charging detection (Charge DET) is apart from the first power terminal by the first distance; and
   the other two signal terminals respectively for confirmation of batteries communication (Cable DET) and batteries awaking (Wake up) are each apart from the second power terminal by the second distance.

3. The electrical connector as claimed in claim 2, wherein three of the multiple signal terminals are respectively for low-voltage bus signal (CAN L), high-voltage bus signal (CAN H), and terminal test (Terminal DET) and are disposed within the second region and away from the first region.

4. The electrical connector as claimed in claim 2, wherein one of the multiple signal terminals is for not available (N/A), is disposed adjacent to the border between the first region and the second region, is apart from the first power terminal by the first distance, and is apart from the second power terminal by the second distance.

5. The electrical connector as claimed in claim 4, wherein the connecting portion is a round pillar and has the flat face being circular and divided into two semi-circles which are respectively the first region and the second region.

6. The electrical connector as claimed in claim 5, wherein
   the base has a recession being circular in cross-section;
   the connecting portion is disposed within the recession and extends upward from a bottom of the recession; and
   an annular space is formed between an inner side surface defined around the recession and a peripheral surface of the connecting portion.

7. The electrical connector as claimed in claim 5, wherein
   one of two ends of each one of the first power terminal and the second power terminal is disposed adjacent to the flat face of the connecting portion, is hollow, and is formed as an inserting hole; and
   the other one of the two ends of each one of the first power terminal and the second power terminal is exposed at a bottom of the base;
   wherein an elastic connector is disposed within the inserting hole of each one of the first power terminal and the second power terminal and has multiple connecting points.

8. The electrical connector as claimed in claim 7, wherein the elastic connector is a crown spring connector.

9. The electrical connector as claimed in claim 5, wherein
   multiple terminal recessions are formed in the connecting portion;
   one of two ends of each one of the terminal recessions is defined through the flat face of the connecting portion, and the other one of the two ends of each one of the terminal recessions is defined through a bottom of the base to form a pin hole; and
   one of two ends of each one of the multiple signal terminals is a contact being tubular, and the other one of two ends of each one of the multiple signal terminals is a narrow pin;
   wherein the contact of each of the multiple signal terminals is disposed within a respective one of the terminal recessions, and the narrow pin of each of the multiple signal terminals extends out from the pin hole.

10. The electrical connector as claimed in claim 2, wherein the connecting portion is a round pillar and has the flat face being circular and divided into two semi-circles which are respectively the first region and the second region.

11. The electrical connector as claimed in claim 10, wherein
   the base has a recession being circular in cross-section;
   the connecting portion is disposed within the recession and extends upward from a bottom of the recession; and
   an annular space is formed between an inner side surface defined around the recession and a peripheral surface of the connecting portion.

12. The electrical connector as claimed in claim 10, wherein
one of two ends of each one of the first power terminal and the second power terminal is disposed adjacent to the flat face of the connecting portion, is hollow, and is formed as an inserting hole; and
the other one of the two ends of each one of the first power terminal and the second power terminal is exposed at a bottom of the base;
wherein an elastic connector is disposed within the inserting hole of each one of the first power terminal and the second power terminal and has multiple connecting points.

13. The electrical connector as claimed in claim 12, wherein the elastic connector is a crown spring connector.

14. The electrical connector as claimed in claim 10, wherein
multiple terminal recessions are formed in the connecting portion;
one of two ends of each one of the terminal recessions is defined through the flat face of the connecting portion, and the other one of the two ends of each one of the terminal recessions is defined through a bottom of the base to form a pin hole; and
one of two ends of each one of the multiple signal terminals is a contact being tubular, and the other one of two ends of each one of the multiple signal terminals is a narrow pin;
wherein the contact of each of the multiple signal terminals is disposed within a respective one of the terminal recessions, and the narrow pin of each of the multiple signal terminals extends out from the pin hole.

15. The electrical connector as claimed in claim 1, wherein the connecting portion is a round pillar and has the flat face being circular and divided into two semi-circles which are respectively the first region and the second region.

16. The electrical connector as claimed in claim 15, wherein
the base has a recession being circular in cross-section;
the connecting portion is disposed within the recession and extends upward from a bottom of the recession; and
an annular space is formed between an inner side surface defined around the recession and a peripheral surface of the connecting portion.

17. The electrical connector as claimed in claim 15, wherein
one of two ends of each one of the first power terminal and the second power terminal is disposed adjacent to the flat face of the connecting portion, is hollow, and is formed as an inserting hole; and
the other one of the two ends of each one of the first power terminal and the second power terminal is exposed at a bottom of the base;
wherein an elastic connector is disposed within the inserting hole of each one of the first power terminal and the second power terminal and has multiple connecting points.

18. The electrical connector as claimed in claim 17, wherein the elastic connector is a crown spring connector.

19. The electrical connector as claimed in claim 15, wherein
multiple terminal recessions are formed in the connecting portion;
one of two ends of each one of the terminal recessions is defined through the flat face of the connecting portion, and the other one of the two ends of each one of the terminal recessions is defined through a bottom of the base to form a pin hole; and
one of two ends of each one of the multiple signal terminals is a contact being tubular, and the other one of two ends of each one of the multiple signal terminals is a narrow pin;
wherein the contact of each of the multiple signal terminals is disposed within a respective one of the terminal recessions, and the narrow pin of each of the multiple signal terminals extends out from the pin hole.

\* \* \* \* \*